United States Patent
Okamura

(10) Patent No.: US 9,961,254 B2
(45) Date of Patent: May 1, 2018

(54) ELECTRONIC DEVICE, CONTROL METHOD FOR SAME, AND STORAGE MEDIUM

(71) Applicant: CANON KABUSHIKI KAISHA, Tokyo (JP)

(72) Inventor: Satoshi Okamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/398,215

(22) Filed: Jan. 4, 2017

(65) Prior Publication Data

US 2017/0195547 A1  Jul. 6, 2017

(30) Foreign Application Priority Data

Jan. 6, 2016  (JP) .................. 2016-001292

(51) Int. Cl.
*H04N 5/232* (2006.01)
*G06K 9/66* (2006.01)
*G06T 7/11* (2017.01)
*G06T 7/70* (2017.01)

(52) U.S. Cl.
CPC .......... *H04N 5/23212* (2013.01); *G06K 9/66* (2013.01); *G06T 7/11* (2017.01); *G06T 7/70* (2017.01); *H04N 5/23203* (2013.01); *H04N 5/23293* (2013.01)

(58) Field of Classification Search
CPC .......... H04N 5/23212; H04N 5/23203; H04N 5/23293; G06T 7/11; G06K 9/66
USPC ...................................... 348/211.9
See application file for complete search history.

(56) References Cited

U.S. PATENT DOCUMENTS

| 2009/0034951 | A1* | 2/2009 | Kawasaki | .......... H04N 5/23293 396/57 |
| 2011/0043663 | A1* | 2/2011 | Tsuchiya | ............ H04N 5/23203 348/240.3 |
| 2015/0036013 | A1* | 2/2015 | Matsuno | ............ H04N 5/23203 348/211.9 |
| 2016/0295120 | A1* | 10/2016 | Ota | .................... H04N 5/23293 |
| 2017/0163871 | A1* | 6/2017 | Irie | .................... H04N 5/23212 |

FOREIGN PATENT DOCUMENTS

| JP | 2007-248615 A | 9/2007 |
| JP | 2010-062834 A | 3/2010 |

* cited by examiner

*Primary Examiner* — Nhan T Tran
(74) *Attorney, Agent, or Firm* — Cowan, Liebowitz & Latman, P.C.

(57) ABSTRACT

An electronic device comprises: a receiving unit configured to receive a focus adjustment operation for remotely operating an image capturing apparatus; an obtainment unit configured to transmit to the image capturing apparatus a focus adjustment command in accordance with having received the focus adjustment operation, and to obtain from the image capturing apparatus information used for a guide display indicating a focus level of a captured image that is information based on a result of performing a focus adjustment based on the command; and a display control unit configured to display the guide display, wherein the display control unit, in a case when the receiving unit receives the focus adjustment operation, displays the guide display based on the focus adjustment operation before obtaining the information based on the result of performing the focus adjustment based on the command.

16 Claims, 10 Drawing Sheets

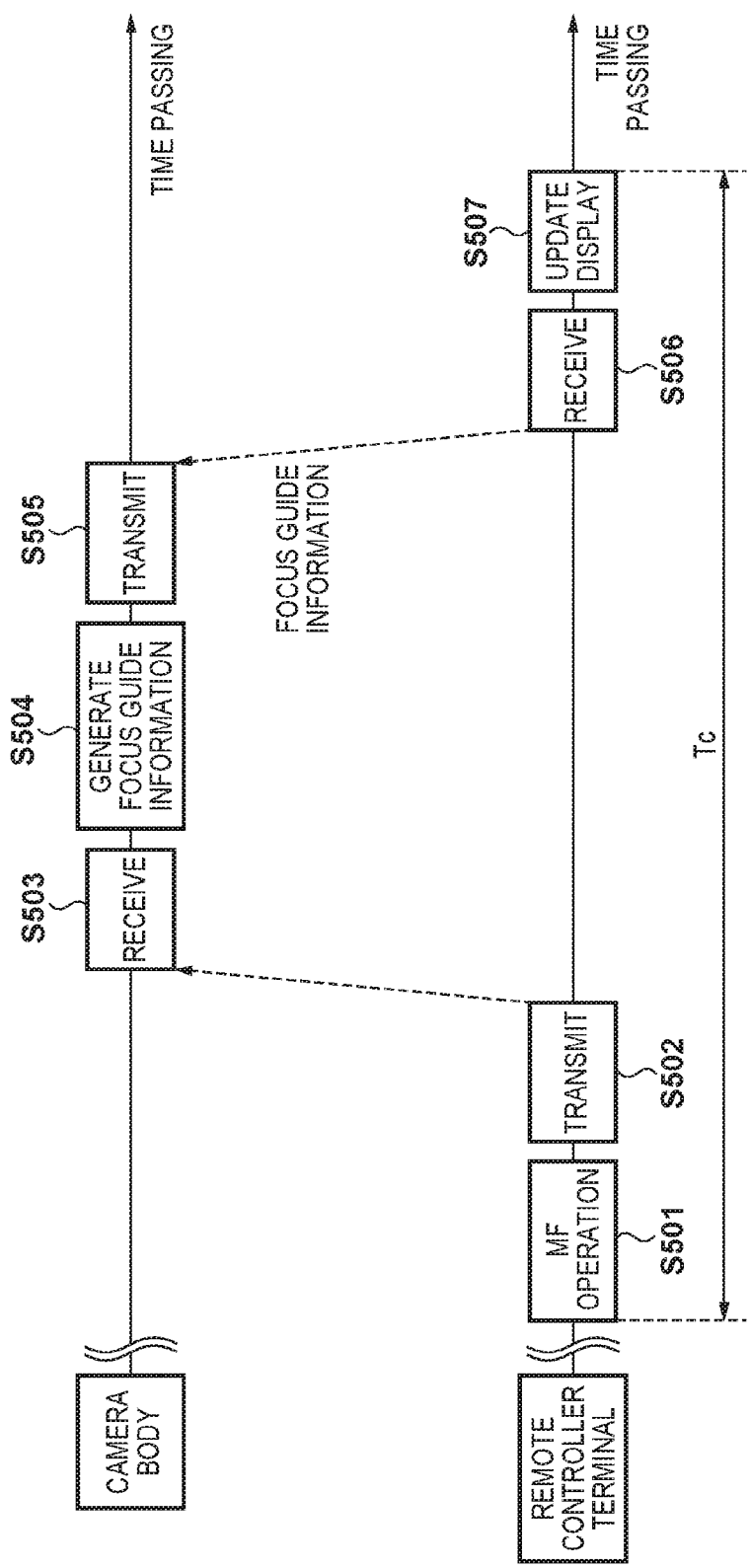

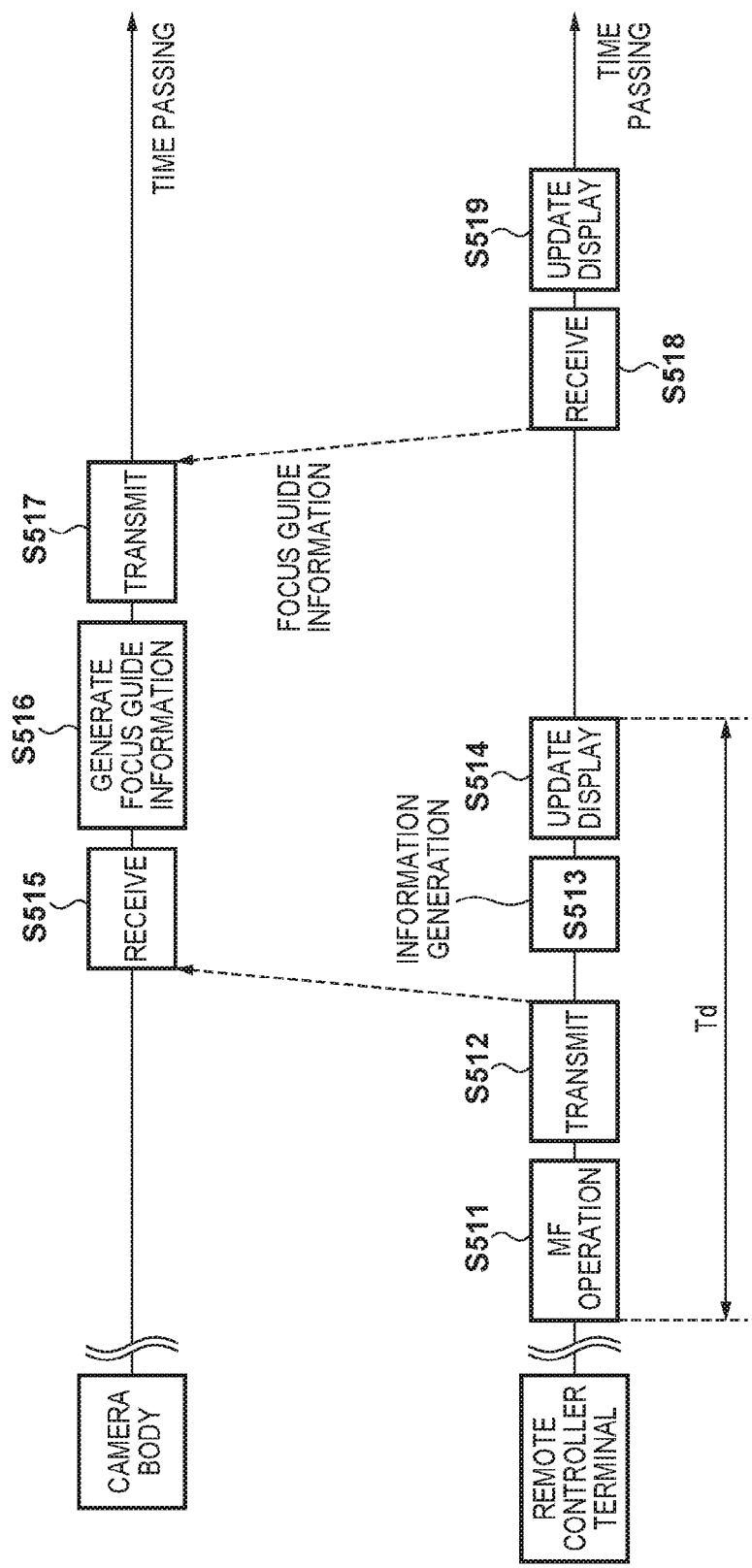

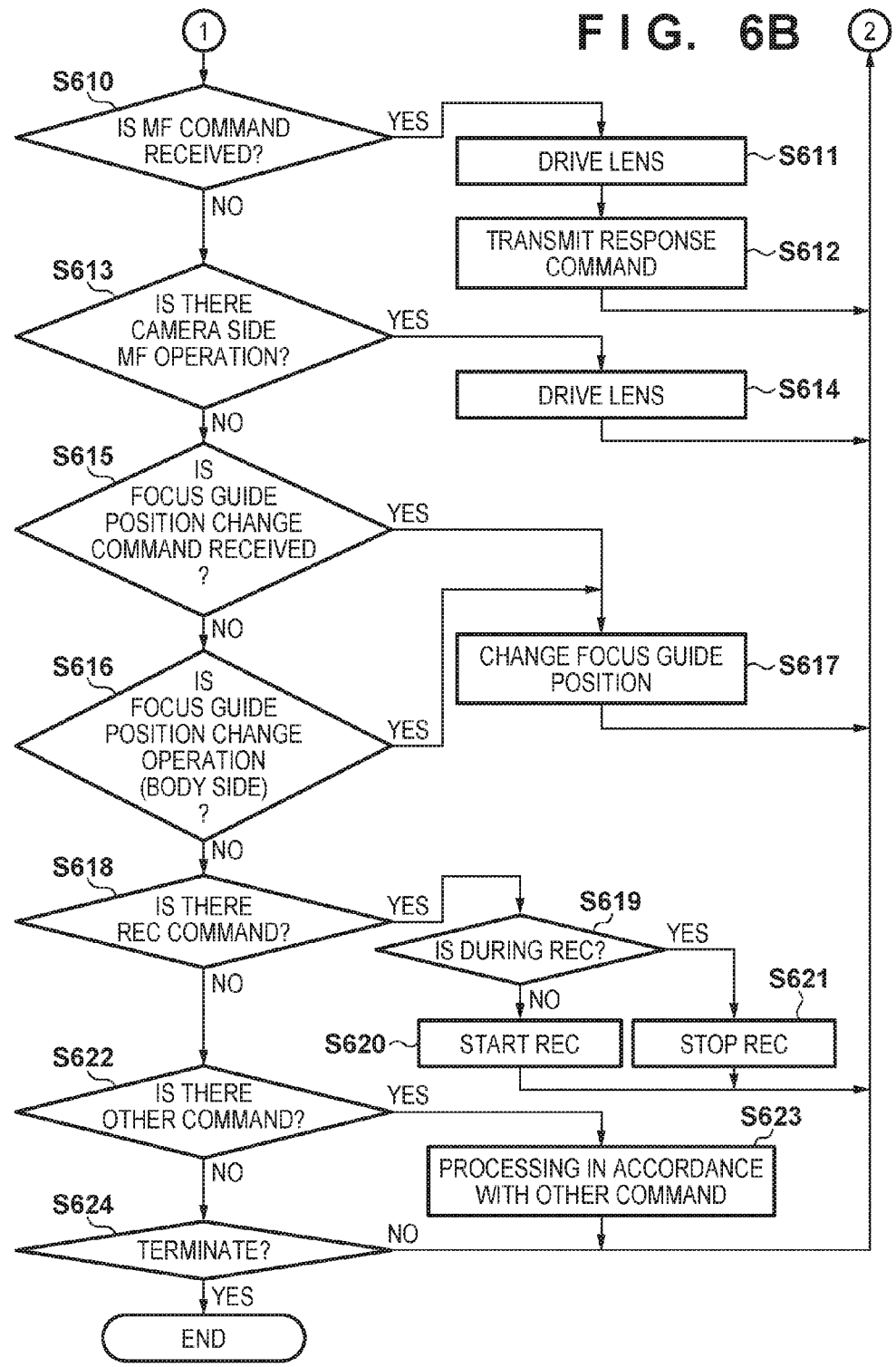

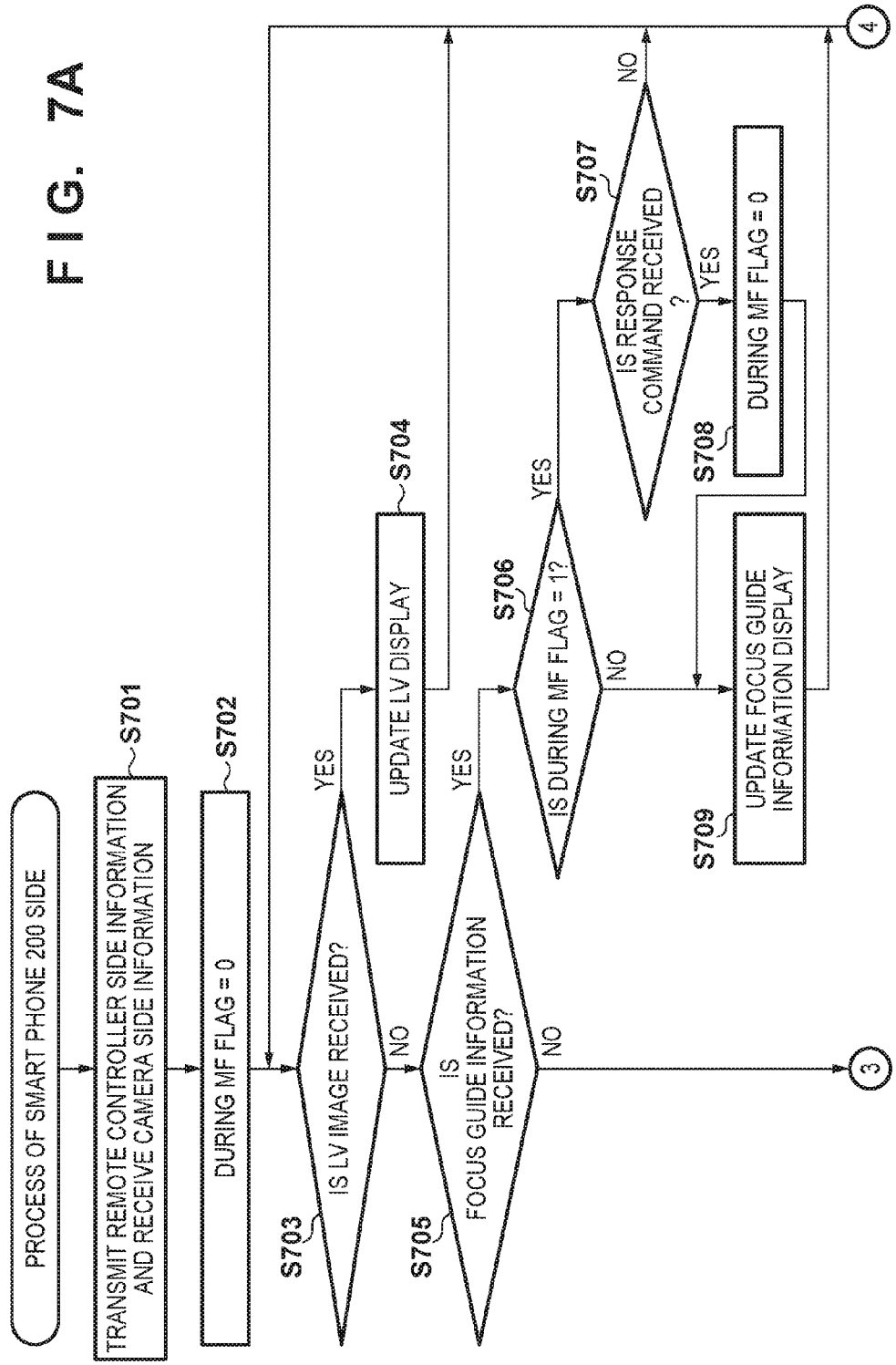

ELECTRONIC DEVICE, CONTROL METHOD FOR SAME, AND STORAGE MEDIUM

BACKGROUND OF THE INVENTION

Field of the invention

The present invention relates to an electronic device, a control method for same, and a storage medium.

Description of the Related Art

Typically, when a photographer performs a manual focus (MF) operation to align the focus on a subject, there are cases where it is not easy to exactly align the focus. In particular, when performing an MF operation while confirming an image that is displayed, for example, on a display panel of an image capturing apparatus, there are cases where it is difficult to determine whether an intended focus condition has been achieved. Therefore, an image capturing apparatus provided with a focus assistance function for displaying additional information regarding a focus condition and supporting focus adjustment by a photographer is known (Japanese Patent Laid-Open No. 2007-248615).

In contrast, an image capturing apparatus in which a wireless communication function is installed and for which a remote operation from a communication apparatus, such as a smart phone or a tablet terminal, is possible is known. However, there are cases in which, for example due to a communication delay between an image capturing apparatus and a communication terminal, matching does not occur between an image from the image capturing apparatus that is confirmed by the communication apparatus while an operation is being performed and an image being captured by the image capturing apparatus, and, upon capturing after changing the zoom position for example, capturing is performed at a different zoom position than for the confirmed image. Japanese Patent Laid-Open No. 2010-062834 proposes an imaging system for obtaining a desired captured image by transmitting to an image capturing apparatus an image confirmed when a user has stopped operation (data for adjustment), and the image capturing apparatus performing capturing based on the data for adjustment.

However, in the above described technique, although a captured image of a state that a user confirms on the communication apparatus can be obtained, there are cases in which, in a process of an operation for approaching a desired focus condition for example, operability decreases due to a time difference between a video image displayed on the communication apparatus and a video image being captured by the image capturing apparatus.

SUMMARY OF THE INVENTION

The present invention has been made in consideration of the aforementioned problems, and realizes a technique capable of performing a focus operation for reducing an influence of a communication delay in a case of performing a remote operation.

In order to solve the aforementioned problems, one aspect of the present invention provides an electronic device, comprising: a receiving unit configured to receive a focus adjustment operation for remotely operating an image capturing apparatus; an obtainment unit configured to transmit to the image capturing apparatus a focus adjustment command in accordance with having received the focus adjustment operation by the receiving unit, and to obtain from the image capturing apparatus information used for a guide display indicating a focus level of a particular region of a captured image that is information based on a result of performing a focus adjustment based on the transmitted focus adjustment command; and a display control unit configured to display the guide display based on the information obtained from the image capturing apparatus by the obtainment unit, wherein the display control unit, in a case when the receiving unit receives the focus adjustment operation, displays the guide display based on the focus adjustment operation before obtaining by the obtainment unit the information based on the result, of performing the focus adjustment based on the focus adjustment command.

Another aspect of the present invention provides, a control method of an electronic device having: receiving a focus adjustment operation for remotely operating an image capturing apparatus; transmitting to the image capturing apparatus a focus adjustment command in accordance with having received the focus adjustment operation, and obtaining from the image capturing apparatus information used for a guide display indicating a focus level of a particular region of a captured image that is information based on a result of performing a focus adjustment based on the transmitted focus adjustment command; and controlling to display the guide display based on the information obtained from the image capturing apparatus, wherein the controlling to display, in a case of receiving the focus adjustment operation, displays the guide display based on the focus adjustment operation before obtaining the information based on the result of performing the focus adjustment based on the focus adjustment command.

Still another aspect of the present invention provides, a non-transitory computer-readable storage medium storing a program for causing a computer to execute a control method of an electronic device having: receiving a focus adjustment operation for remotely operating an image capturing apparatus; transmitting to the image capturing apparatus a focus adjustment command in accordance with having received the focus adjustment operation, and obtaining from the image capturing apparatus information used for a guide display indicating a focus level of a particular region of a captured image that is information based on a result of performing a focus adjustment based on the transmitted focus adjustment command; and controlling to display the guide display based on the information obtained from the image capturing apparatus, wherein the controlling to display, in a case of receiving the focus adjustment operation, displays the guide display based on the focus adjustment operation before obtaining the information based on the result of performing the focus adjustment based on the focus adjustment command.

According to the present invention it becomes possible to perform a focus operation for reducing an influence of a communication delay in a case of performing a remote operation.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 5A-5B are views for illustrating an operation sequence between the video camera and the smart phone for displaying a focus guide according to embodiments.

FIGS. 6A-6B are flowcharts illustrating a series of operations in a digital video according to embodiments.

FIGS. 7A-7B are flowcharts illustrating a series of operations in a smart phone according to embodiments.

DESCRIPTION OF THE EMBODIMENTS

Figure 1:
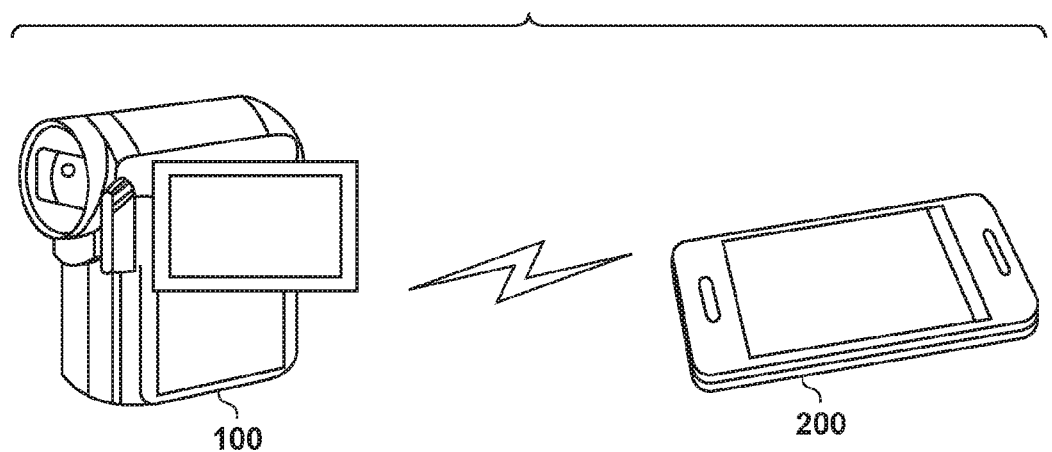
FIG. 1 is a view illustrating a system configuration that uses a smart phone as an example of an electronic device and a video camera as an example of an image capturing apparatus, according to embodiments of the present invention.

Explanation in detail is given below of embodiments for working the present invention. Note that explanation is given below regarding an example of applying to the present invention a video camera as an example of an image capturing apparatus, and a smart phone that is a type of a mobile telephone terminal as an example of an electronic device for remotely operating the video camera (in other words a remote controller terminal). FIG. 1 illustrates a communication system in which a video camera 100 and a smart phone 200 are connected via wireless communication. The video camera 100 and the smart phone 200 are respectively connected via wireless communication by an antenna 113 and an antenna 207, and intercommunication is possible.

(Configuration of Video Camera 100)

Figure 2A:
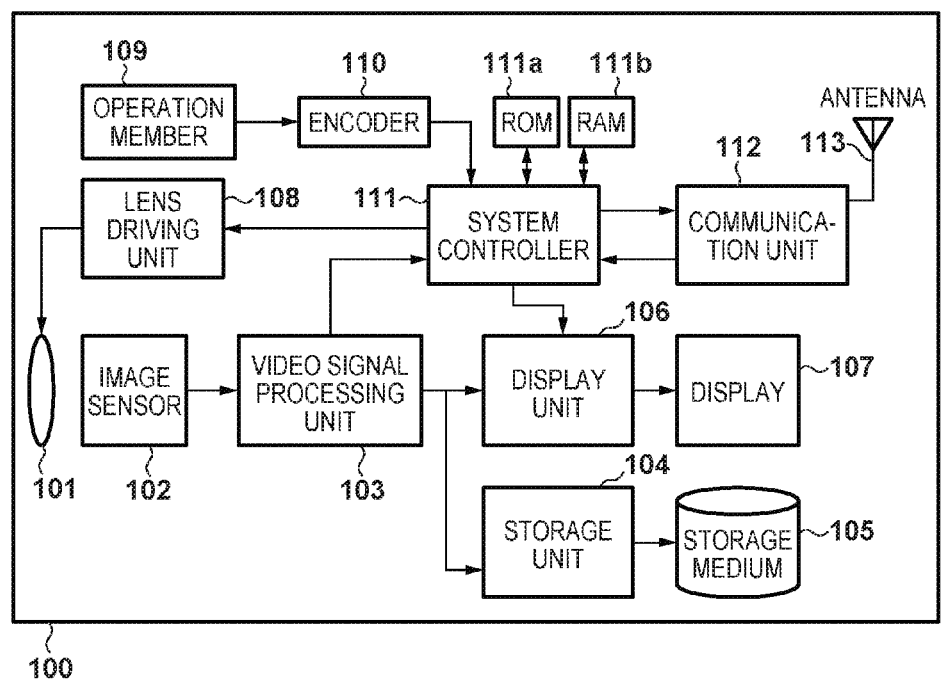
FIG. 2A is a block diagram for illustrating an example of a functional configuration of a video camera according to embodiments.
Figure 2B:
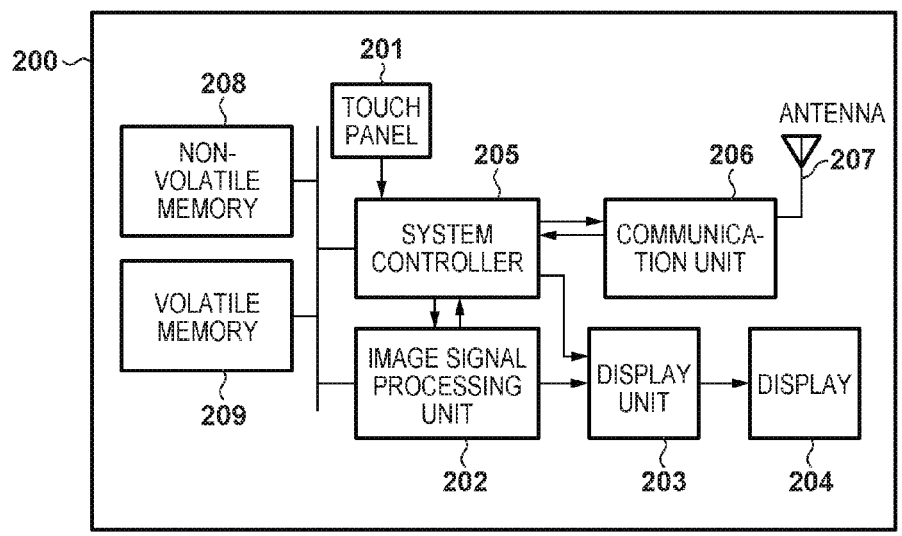
FIG. 2B is a block diagram for illustrating an example of a functional configuration of a smart phone.

Next, with reference to the system block views illustrated in FIG. 2A and FIG. 2B, explanation is given in order for the configuration of the video camera 100 and the smart phone 200, respectively.

Firstly, in the configuration of the video camera 100, an imaging optical system. 101 is an optical system configured from a lens group for forming a subject image that includes a focus lens and a zoom lens, an aperture, or the like. An image sensor 102 photoelectrically converts a subject image formed by the imaging optical system 101, and outputs an image signal at a rate of 30 frames/second for example (in other words, outputs a video signal). In addition, the image sensor 102 has for example two photoelectric conversion regions in one pixel, and can output an image signal (a phase difference signal) having parallax by capturing once in accordance with receiving a light beam that has passed through a different pupil region of the imaging optical system 101. The image sensor 102 outputs to a video signal processing unit 103 the phase difference signal output by this imaging plane phase difference detection method.

The video signal processing unit 103 performs predetermined image processing such as white balance control to the video signal input from the image sensor 102, and outputs to a storage unit. 104 and a display unit 106. Furthermore, based on the phase difference signal output from the image sensor 102, it calculates a corresponding point of each pixel, for example, outputs as phase difference information an obtained phase difference for each pixel to a system controller 111.

The storage unit 104 performs predetermined encoding processing on an input video signal, and converts it to encoded data. The storage unit 104 compresses a data amount of the video signal in conjunction with the encoding processing, and stores it to a storage medium 105. The storage medium 105 includes a semiconductor storage apparatus or a magnetic storage apparatus, and stores an image signal or a video signal encoded is accordance with control by the storage unit 104. The storage medium 105 may be configured to be able to be attached/detached.

With respect to an input video signal, the display unit 106 generates OSD (On Screen Display) data for configuring a GUI (Graphical User interface, combines it with the video signal, and also performs image processing such as resize processing. A display 107 includes a display panel configured by an LCD or LEDs, for example, and displays a video signal output from the display unit 106.

A lens driving unit 108 is configured from an actuator or the like, and drives the lens group included is the imaging optical system 101 in accordance with an instruction from the system controller 111. An operation member 109 includes a selection switch for a user to switch auto or manual control of a focusing operation, a focus ring for a user to perform a focus adjustment operation, a zoom locker for a user to perform a zoom adjustment operation, or the like. When a user causes the operation member 109 to physically displace (rotation or graveling),, the displacement is input to an encoder 110. The encoder 110 includes an AD converter, a photo-interrupter, and an input capture, for example. The encoder 110 inputs to the system controller 111 information such as MF/AF, an operation amount, an operation direction, or a lens position for example, which is information obtained by the encoder 110 converting the displacement inputted from the operation member 109 into an electrical signal.

A communication unit 112 includes a module or a processing circuit capable of bidirectional communication with an external apparatus including the smart phone 200, and implements wireless communication by a method that complies with a publicly known communication specification such as IEEE 802.11n for example. In accordance with an instruction from the system controller 111, the communication unit 112 modulates transmission data by a predetermined modulation method and transmits it by the antenna 113. Meanwhile, if communication data transmitted from an external apparatus is received by the antenna 113, the communication unit 112 demodulates the received data to obtain the communication data transmitted from the external apparatus.

Note that, to cause the transmission operation of the communication unit 112 to operate by a predetermined cycle (polling) the system controller 111 periodically detects the existence or absence of communication data, and notifies a result thereof to the communication unit 112. In addition, to similarly cause reception operation of the communication unit 112 to operate by a predetermined cycle, the communication unit 112 periodically detects the existence or absence of communication data, and notifies a result thereof to the system controller 111.

The system controller 111 includes a CPU or an MPU, and performs control of the video camera 100 overall by loading a program stored in the ROM 111a into a work area of the RAM 111b and executing it. That is, by transmitting instructions to the above described video signal processing unit 103, the display unit 106, the lens driving unit 108, the encoder 110, and the communication unit 112, the system controller 111 controls them. Furthermore, the system controller 111 determines a defocus amount based on the phase difference information generated by the video signal processing unit 103, and generates information (simply referred to as focus guide information) necessary for a focus guide display that is described later.

(Configuration of Smart Phone 200)

Next, explanation is given regarding the configuration of the smart phone 200. A touch panel 201 is an input apparatus (a receiving unit) that receives an input operation from a user by detecting a contact, close proximity, or pressure, for example. An image signal processing unit 202 performs image processing, which includes transformation processing, with respect to image data input to the smart phone 200. The image data after processing is transmitted to a display unit 203.

The display unit 203 generates a GUI screen in accordance with an instruction from a system controller 205, and causes it to be displayed on a display 204 along with the image data received from the image signal processing unit 202 previously described. The display 204 includes a display panel configured by an LCD or LEDs, for example, and displays an image signal output from the display unit 203.

A non-volatile memory 208 includes a semiconductor memory or a magnetic storage apparatus for example, and stores an application program that is operated by the smart phone 200. In addition, a volatile memory 209 includes a DRAM or an SRAM for example, and temporarily stores data such as an input image, in addition to information of a function or a variable for causing the application program to operate.

A communication unit 206 includes a module or a processing circuit capable of bidirectional communication with an external apparatus including the video camera 100, and implements wireless communication by a method that complies with a publicly known communication specification such as IEEE 802.11n for example. In accordance with an instruction from the system controller 205, the communication unit 206 modulates transmission data by a predetermined modulation method and transmits it by the antenna 207. Meanwhile, if communication data transmitted from an external apparatus is received by the antenna 207, the communication unit 206 demodulates the received data to obtain the communication data transmitted from the external apparatus.

Note that, to cause the transmission operation of the communication unit 206 to operate by a predetermined cycle (polling) the system controller 205 periodically detects the existence or absence of communication data, and notifies a result thereof to the communication unit 206. In addition, to similarly cause reception operation of the communication unit 206 to operate by a predetermined cycle, the communication unit 206 periodically detects the existence or absence of communication data, and notifies a result thereof to the system controller 205.

The system controller 205 includes a CPU or an MPU, and controls the smart phone 200 overall by loading a program stored in the non-voiatiie memory 208 into a work area of the volatile memory 209, and executing it. In other words, by transmitting commands to the above-described touch panel 201, the image signal processing unit 202, the display unit 203 and the communication unit 206, the system controller 205 controls them. Furthermore, based on the focus guide information that the communication unit 206 receives from the video camera 100, it determines a defocus amount and performs a display control for a focus guide.

(Example of Displaying a Focus Guide)

Next, explanation is given regarding the focus guide display according to the present embodiment, with reference to FIG. 3A-FIG. 3F. The focus guide indicates a focus level (in other words a defocus amount) of a particular region on a captured image at a time of a focus adjustment operation (also referred to as an MF operation), and is displayed on the display 204 of the smart phone 200 (and the display 107 of the video camera 100).

Figures 3A, 3B, 3C, 3D, 3E, 3F:
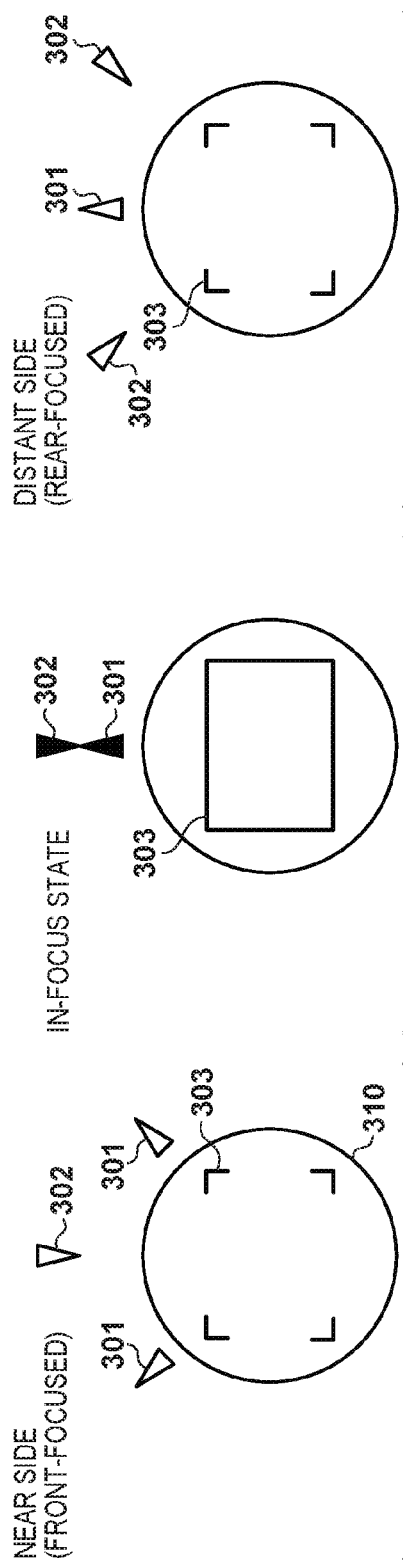
FIGS. 3A-3F are views for illustrating examples of displaying the focus guides according to embodiments.

FIG. 3A, FIG. 3B, and FIG. 3C each illustrate an example of a focus guide display that indicates a defocus amount. The difference of each display indicates a difference of the defocus amount at the subject. FIG. 3A flustrates a state in which a defocus amount is large and an in-focus position is in a near side (a front side of the imaging plane), which is a so-called "front-focused" state. FIG. 3C illustrates a state in which a defocus amount is large and an in-focus position is in a distant side (a rear side of the imaging plane), which is a so-called. "rear-focused" state. FIG. 3B illustrates an in-focus state in which the defocus amount is approximately 0.

The focus guide is configured so as to indicate a defocus amount, direction and state. The focus guide is, for example, configured by a circular ring 310, one or more wedges 301 arranged facing outward in relation to the center of the ring 310, one or more wedges 302 arranged facing the center of the ring 310, and a detection frame 303 arranged inside the ring 310. If the focus lens is positioned on a near side as in FIG. 3A, a plurality of the wedge 301 (for example separated :left and right) are displayed, and the wedge 302 displayed in a 12 o'clock direction (on top) on the circumference. For the detection frame 303, only a form of corners of a frame is displayed.

In addition, if the focus lens is positioned on a distant side as in FIG. 3C, the wedge 301 is displayed in a 12 o'clock direction on the circumference, and a plurality of the wedge 302 is displayed (for example separated left and right). Similarly to the case of FIG. 3A, for the detection frame 303 only a form of corners of a frame is displayed.

However, in the in-focus state illustrated in FIG. 3B, one of each of the wedge 301 and the wedge 302 are displayed toward a 12 o'clock direction on the circumference, and for the detection frame 303, the entire circumference of the frame is displayed. Note that, in the in-focus state, a display color of the wedge 301 and the wedge 302 may be caused to be different to than in a case that is not the in-focus state.

Positions of the wedge 301 and the wedge 302 on the circumference are determined from the focus guide information. The focus guide information is generated based on the phase difference information which is based on the phase difference signal output from the image sensor 102. The focus guide information includes focus level information and information on a state taken of any of in-focus/front-focused/rear-focused that is calculated based on the defocus amount. Upon receiving the received focus guide information, the system controller 205 determines which of the wedge 301 and the wedge 302 to arrange at the 12 o'clock direction based on the information on which state out of in-focus/front-focused/rear-focused is taken. In addition, based on the focus level information, a wedge display angle (a distance or an angle between two wedges of those that are not fixed at the 12 o'clock direction) is determined. By causing the configuration of the focus guide display to differ in accordance with a position of the focus lens (that is, a near side or a distant side), a user can easily and appropriately grasp a direction on of an MT operation necessary to achieve an in-focus state.

In addition, the system controller 205 controls a distance between two wedges that are facing inward or facing outward, in accordance with the focus level. In other words, the greater defocus becomes from an in-focus state, the greater a distance between wedges not displayed at the 12 o'clock direction and the greater the distance (angle) from the 12 o'clock direction becomes. For example, the size of an angle sandwiched between the wedge 301 and the wedge 302 from a display center O of the focus guide becomes larger proportional to the defocus amount.

FIG. 3D, FIG. 3E, and FIG. 3F each illustrate an example of displaying in cases of different defocus amounts. The defocus amount becomes smaller in an order from FIG. 3D, FIG. 3E, to FIG. 3F, and approaches the in-focus state. The system controller 205 makes that angle sandwiched between the wedge 301 and the wedge 302 from the display center of the focus guide become smaller of an order from a, b, to c in conjunction with change of the defocus amount. The size of the previously described angle is proportional to the distance of the circular shape of the wedge 301 and the wedge 302. In this way, by grasping the size of the distance between the wedge 301 and the wedge 302, a user can easily grasp an approximate defocus amount.

By viewing a display of the focus guide described above, a user can appropriately grasp a direction of an MF operation necessary to achieve an in-focus state, and to what level is the separation from focus. In other words, a user can easily adjust from a current focus state to the in-focus state.

Figure 4:
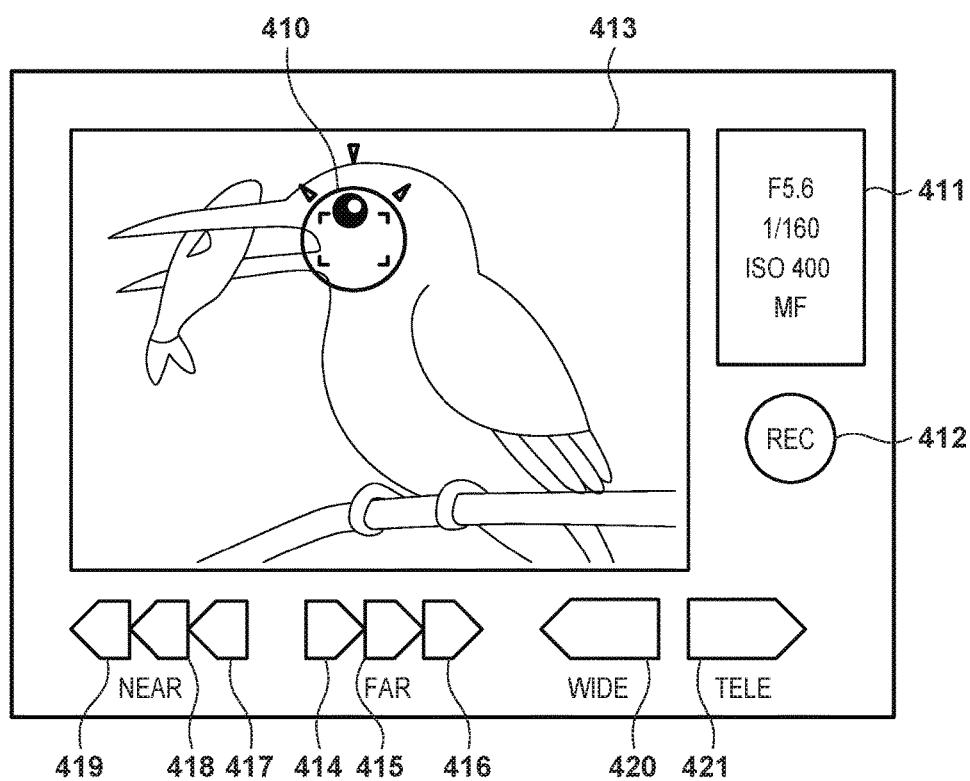
FIG. 4 is a view for illustrating an example of a GUI that includes a focus guide, according to embodiments.

Next explanation with reference to FIG. 4 is given for a GUI screen of an application program that has a remote controller function for operating the smart phone 200. Upon activation, the application program obtains, by wireless communication, a live view (LV) image 413 captured by the video camera 100, and displays it. Camera information 411 is a status screen for displaying capturing information such as an aperture value, a shutter speed, an ISO sensitivity, or an MF/AF state. A REC button 412 is a touch button for performing, by a tap operation of the touch panel 201, a RFC instruction for notifying start or termination of recording to the video camera 100.

An MF button 414, an MF button 415, and an MF button 416 are touch buttons for performing manual focus adjustment (MF) to the distant side. If any button is touched, the system controller 205 transmits to the video camera 100 a focus adjustment command. (MF command) to the distant side that has an operation amount different for each button. An MF button 417, an MF button 418, and an MF button 419 are all touch buttons for performing an MF operation to the near side. If any button is touched, the system controller 205 transmits to the video camera 100 an MF command to the nearside that has an operation amount different for each button.

The MF buttons respectively designate what fraction of a depth of focus to send. The system controller 205 sets a focus change amount on distant side to be increasingly large in an order of the MF button 414, the MF button 415, the MF button 416, and for the near side sets a focus change amount to be increasingly large in an order of the MF button 417, the MF button 418, the MF button 419. A zoom key 420 and a zoom key 421 are touch buttons for notifying the video camera 100 of operations for a zoom operation to a wide angle side or a telephoto side, respectively. A focus guide 410 is the focus guide described in FIG. 3A-FIG. 3F, and indicates a focus level of any state out of front-focused, rear-focused, in-focus, or very blurred, with regards to a subject at a position displayed by the focus guide.

A user, while looking at the GUI screen of the smart phone 200 described above, can perform a setting or an operation of the video camera 100 by a remote operation.

(Sequence Between Devices for Focus Guide Display)

Next, description is given of a sequence in a case of displaying the focus guide 410 at a time of an MF operation by the smart phone 200.

Firstly, description is given for FIG. 5A of a sequence for when the present invention is not applied. Upon any of the MF buttons 414-419 remote controller terminal being touched (step S501), (the smart phone 200) transmits an MF command corresponding to the touched button from the remote controller terminal to a camera body (the video camera 100) (step S502). Meanwhile, the camera body receives the MF command from the remote controller terminal (step S503), and drives the focus lens in accordance with the received MF command to execute MF. After the MF is executed, focus guide information based on a phase difference signal output from the image sensor 102 is generated (step S504), and the generated focus guide information is transmitted to the remote controller terminal (step S505). The remote controller terminal, upon receiving the focus guide information (step S506), updates the display of the focus guide 410 being displayed on the remote controller terminal based on the received focus guide information (step S507). In this way, until the display of a focus guide 410 is updated by causing it to reflect the MF operation performed by the user in step S501, there is information communication two times: in step S502 to step S503 and step S505 to step S506 (one round trip's worth), and it takes time for MF execution. Therefore, if there is a communication delay, it takes a time Tc from when the MF operation is performed in step S501 until the display of the focus guide 410 is updated to reflect this (there is a delay), and there is a possibility that a user would feel that responsiveness is not sufficient. In addition, if successive MF operations are performed, regardless of whether operations of an operation amount sufficient to cause focus are performed, the focus guide can become a state of not yet indicating focus due to a display delay of the focus guide in the remote controller terminal. Therefore a user may continue to further perform successive MF operations and as a result not be able to stop operations in a desired state, and the focus state may go too far (the MF operations may go too far).

Next, description is given of a sequence for the focus guide display according to the present embodiment in FIG. 5B. Upon any of the MF buttons 414-419 being touched in the remote controller terminal (step S511), an MF command corresponding to the touched button is transmitted from the remote controller terminal (the smart phone 200) to the camera body (the video camera 100) (step S512). The remote controller terminal, before receiving focus guide information from the camera body, generates predicted focus guide information based on the operation amount of the MF operation of the remote controller terminal (which of the MF buttons 414-419 was touched) (step S513). The remote controller terminal, based on the predicted focus guide information, updates the display of the focus guide 410 displayed on the display 204 (step S514). Meanwhile, the camera body receives the MF command from the remote controller terminal (step S515), and drives the focus lens of the imaging optical system 101 in accordance with the received MF command to execute MF. The camera body generates focus guide information based on the phase difference signal output from the image sensor 102 after MF is executed (step S516), and transmits it to the remote controller terminal (step S517). The remote controller terminal, upon receiving the focus guide information (step S518), updates the display of the focus guide 410 being displayed on the display 204 based on the received focus guide information (step S519). By this, the focus guide 410, for which display has been updated based on the predicted focus guide information, is updated to something accurate based on the focus guide information generated based on the phase difference signal output from the image sensor 102. In this way, in FIG. 5B, from input of the MF operation performed in step S511 until the display of the focus guide 410 is updated in step S514, time required for information communication two times (one round trip's worth) and MF execution in the camera body—which is necessary in FIG. 5A—is not taken. Therefore, a time Td from when the MF operation is performed in step S511 until the display of the focus guide is updated in step S514 is shorter than Tc described by FIG. 5A. In other words, it is possible to speed up responsiveness of the focus guide 410 with respect to an MF operation in the remote controller terminal. Therefore, it is possible to prevent an MF operation going too far as described above.

(Series of Operations for Focus Guide Display in the Video Camera 100)

Furthermore, flowcharts for executing processing described in the above described FIG. 5B are exhibited in FIGS. 6A-6B and FIGS. 7A-7B.

Figure 6A:
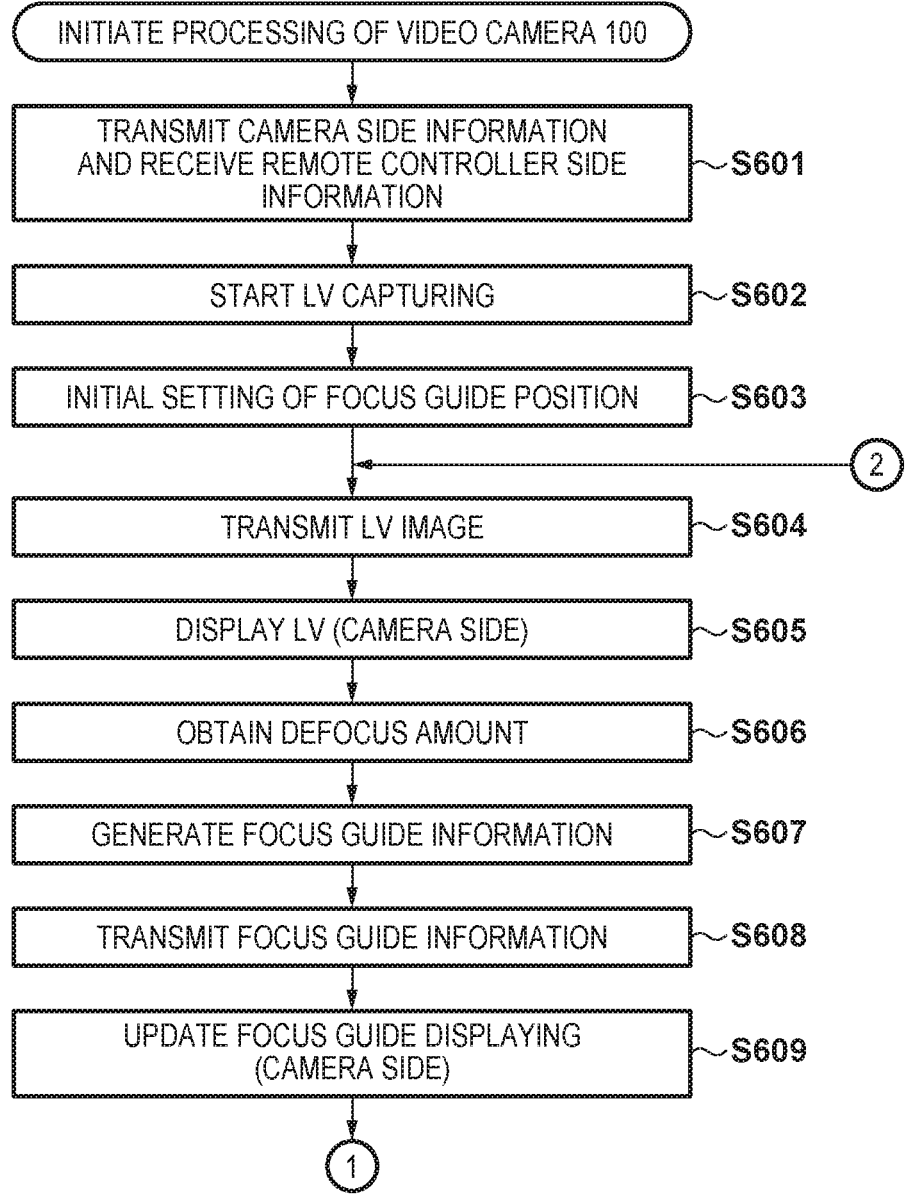

Firstly, FIGS. 6A-6B are used to give a description regarding processing operations on the video camera 100 (camera body) side. Note that processing operation of the flowcharts of FIGS. 6A-6B realized by a CPU or MPU of the system controller 111 loading a program stored in the ROM 111a into the RAM 111b and executing it. In addition, an application program for remote capturing embedded in the smart phone 200 (remote controller terminal) is activated, and upon connection processing between the smart phone 200 and the video camera 100 completing, processing illustrated in FIGS. 6A-6B is initiated in the video camera 100.

In step S601, the system controller 111 transmits camera-side information to the smart phone 200, and also receives remote-controller-side information. The camera-side information includes information relating to the focus lens included in the imaging optical system 101 (in particular, information relating to depth of focus), camera setting information, camera device-specific information (device ID), or the like. The remote-controller-side information includes version information or identification information of the application program executed by the smart phone 200, or the like.

In step S602, the system controller 111 starts capturing of a live view (LV), and obtains an LV image for successive displaying from the image sensor 102.

In step S603, the system controller 111 performs an initial setting of a position for displaying the focus guide 410 (in other words, a range for obtaining a defocus amount from the image; hereinafter a focus guide position). In the present embodiment, the system controller 111 performs publicly known face detection processing with respect to the LV image, and performs an initial setting by setting as the focus guide position a position of a face determined to be a main face if a face is detected, or the center of the image if a face is not detected.

In step S604, the system controller 111 transmits the LV image to the smart phone 200.

In step S605, the system controller 111 displays the LV image on the display 107 which is the display unit of the video camera 100. Note that, because it is in a state of being connected to the smart phone 200 and performing remote capturing, configuration may also be taken such that the system controller 111 does not display the LV image on the display 107 (in other words not perform this step for displaying the LV image on the camera side).

In step S606, the system controller 111 calculates and obtains a defocus amount based on the phase difference signal of the focus guide position output from the image sensor 102.

In step S607, the system controller 111 generates the previously described focus guide information based on the defocus amount obtained in step S606. The focus guide information includes focus level information and information on a state taken of any of in-focus/front-focused/rear-focused that is calculated based on the defocus amount.

In step S608, the system controller 111 transmits the focus guide information generated in step S607 to the smart phone 200. Note that configuration may be taken such that the focus guide information transmitted to the smart phone 200 is not of a form of focus level information and information of which state of in-focus/front-focused/rear-focused as described previously, but is a form of angles of wedge types, and a position in the live view image and a size of the frame. In this way, a necessity to calculate in the smart phone 200 which way to update the display of the focus guide from the focus level information and the information of which state of in-focus/front-focused/rear-focused ceases. In other words, it is possible to have the program of the smart phone 200 be something simpler.

In step S609, the system controller 111, based on the focus guide information generated in step S607, updates the display of the focus guide that is displayed on the display 107 of the video camera 100 (newly displayed in a case of not yet being displayed). Note that, in a case of not displaying an LV image on the display 107 in step S605, configuration may also be taken such that the system controller 111 does not perform this step.

In step S610, the system controller 111 determines whether an MF command has been received in accordance with operation of any MF button by the smart phone 200. The system controller 111 advances processing to step S611 if an MF command has been received, and advances the processing to step S613 if one is not received.

In step S611, the system controller 111 controls the lens driving unit 108 by a direction and driving amount based on the received MF command to drive the focus lens included in the imaging optical system 101. More specifically, the system controller 111 determines a target lens position for which to provide a change amount for a defocus amount based on the received MF command, with respect to a current lens position of the focus lens that configures the imaging optical system 101. The system controller 111 causes an actuator comprised by the lens driving unit 108 to operate so that the focus lens reaches the determined target lens position. Once operation of the lens driving unit 108 completes, the processing proceeds to step S612.

In step S612, the system controller 111 transmits a response command to the smart phone 200 in accordance with driving of the focus lens based on the received MF command having completed. This is a command for indicating whether an MF action instructed from the smart phone 200 has finished executing. Configuration may be taken so as to issue an ID for each MF command, and transmit a response command to the smart phone 200 so that the ID can be identified. By configuring in this way, if an MF button is continuously touched many times, it is possible to notify the smart phone 200 to which operation execution has been performed. Upon transmitting the response command, the system controller 111 advances the processing to step S604, and repeats the above-described processing.

In step S613, the system controller 111 determines whether there is an MF operation (for example, an operation for the focus ring) to the operation member 109 which is an operation unit of the video camera 100. The system controller 111 advances processing to step S614 if there is an MF operation, and advances the processing to step S615 if there is not an MF operation.

In step S614, the system controller 111 controls the lens driving unit 108 by a direction and driving amount based on the MF operation performed in step S613 to drive the focus lens included in the imaging optical system 101. The processing returns to step S604, and the above-described processing is repeated.

In step S615, the system controller 111 determines whether a change command for the focus guide position has been received from the smart phone 200. The system controller 111 advances processing to step S617 if a change command has been received, and advances the processing to step S616 if one is not received.

In step S616, the system controller 111 determines whether there is a change operation for the focus guide position in accordance with operation of the video camera 100. The focus guide position can be set to any position by a user in accordance with a touch to a position on a LV with respect to a touch panel integrally configured with the display 107, an operation of arrow keys which are an operation member of the camera body side, or the like if there is a change operation for the focus guide position, the system controller 111 advances the processing to step S617, and if there is no change operation for the focus guide position, advances the processing to step S618.

In step S617, the system controller 111 changes the focus guide position based on the change command for the focus guide position received in step S615 or the change operation for the focus guide position performed in step S616. Upon changing the focus guide position, the system controller 111 returns the processing to step S604, and repeats the above-described processing.

In step S618, the system controller 111 determines whether a REC command from the smart phone 200 has been received, or whether there has been a REC command due to an operation with respect to the REC button of the camera body side. The system controller 111 advances processing to step S619 if there is a REC command, and advances the processing to step S622 otherwise.

In step S619, the system controller 111 determines whether the video camera 100 is currently recording (during recording of a video). If recording is determined, the processing proceeds to step S621, and if not recording is determined the processing proceeds to step S620. Note that, if the recording in the video camera 100 is temporarily a recording stand by in accordance with a pause or the like, the system controller 111 determines that recording is being performed and advances the processing to step S621, In step S620, to start recording, the system controller 111 generates a new movie file, and starts recording (REC) of an image signal output from the image sensor 102. Upon starting recording of a video, the processing returns to step S604, and the above-described processing is repeated. That is, even if the process of recording a video, the video camera 100 can display the focus guide 410 and an MF operation can be performed.

In step S621, the system controller 111 stops recording and also performs closing processing of the movie file. The system controller 111 returns the processing to step S604, and repeats the above-described processing.

In step S622, the system controller ill determines whether a further command has been received. If a further command has been received, the processing proceeds to step S623, and if a further command has not been received, the processing proceeds to step S621 In step S623, the system controller 111 performs processing in accordance with the further command. A further commands includes a zoom command for example. If a zoom command is received from the smart phone 200 or a zoom operation is performed at the video camera 100, a zoom lens is driven to perform an optical zoom to the telephoto side or the near side. In addition, a further command my include a change command for an image capturing setting, such as a shutter speed, an aperture value, arm ISO sensitivity, recording image quality, or an aspect ratio. If a change command of an image capturing setting is received from the smart phone 200 or an image capturing setting change operation is performed at the video camera 100, the system controller 111 changes the image capturing setting, and transmits information for the image capturing setting after the change to the smart phone 200. Furthermore, a further command includes a still image capturing command, If a still image capturing command from the smart phone 200 is received or a still image capturing operation is performed on the video camera 100 side, a still image is captured by the image sensor 102 recorded in the storage medium 105 as a still image file. Furthermore, a further command may include an ON/OFF switching command of the focus guide display. In a case of having received an ON/OFF switching command for the focus guide display from the smart phone 200, or a case in which an ON/OFF switching operation for the focus guide display is performed at the video camera 100, a setting for ON/OFF of the focus guide display is switched from ON to OFF or OFF to ON. In a case of switching to OFF, the previously described processing of step S606-step S609 and step S615-step S617 is not performed.

In step S624, the system controller 111 determines whether there is a termination event. A termination event includes cutting of communication with the smart phone 200, turning a power supply off on the camera body side, switching an operation mode of the camera body side to an operation mode (for example a playback mode) other than an image capturing mode, or like. If there is no termination event, the processing returns to step S604 and the above described processing repeats, and if there is a termination event the series of operations of this processing end.

(Series of Operations for Focus Guide Display in the Smart Phone 200)

Figure 7B:
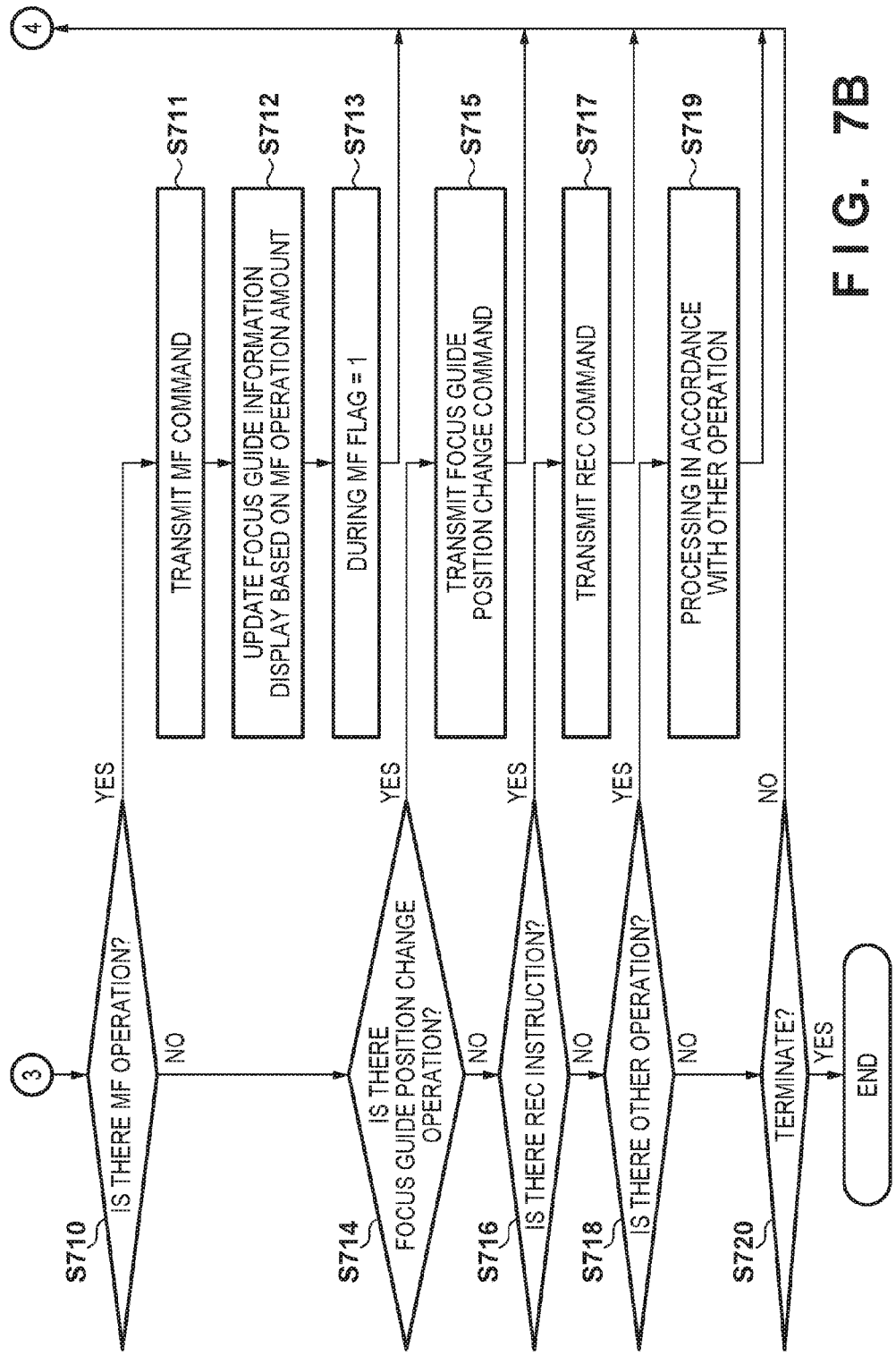

Next, FIGS. 7A-7B are used to give a description regarding processing operations on the smart phone 200 (remote controller terminal) side. Note that operation processing of the flowcharts of FIGS. 7A-7B is realized by a CPU or MPU of the system controller 205 loading a program stored in the non-volatile memory 208 into the volatile memory 209 and executing it. In addition, upon activating an application program for remote capturing by the smart phone 200 and completing a connection between the smart phone 200 and the video camera 100, processing of FIGS. 7A-7B is started in the smart phone 200.

In step S701, the system controller 205 transmits remote-controller-side information to the video camera 100, and also receives camera-side information. As described above, the camera-side information includes information relating to the focus lens included in the imaging optical system 101 (in particular, information relating to depth of focus), camera setting information, camera device-specific information, or the like. In addition, the remote-controller-side information includes version information or identification information of the application program executed by the smart phone 200, or the like.

In step S702, the system controller 205 initializes a during MF flag held in the volatile memory 209 to 0. The during MF flag is a flag for indicating whether or not a time is from an MF operation being performed by the smart phone 200 to a response indicating that the video camera 100 has executed MF driving that reflects the MF operation being received (during MF flag=1).

In step S703, the system controller 205 determines whether an LV image captured by the image sensor 102 of the video camera 100 has been received from the video camera 100. If an LV image has been received the processing proceeds to step S704, and if not received the processing proceeds to step S705. In step S704, the system controller 205 displays the received LV image on the display 204 of the smart phone 200.

In step S705, the system controller 205 determines whether it has received focus guide information from the video camera 100. The system controller 205 advances processing to step S706 if focus guide information has been received, and advances the processing to step S710 if this is not received.

In step S706, the system controller 205 determines whether the during MF flag is 1. If the during MF flag is 1 the processing proceeds to step S707, and if the during MF flag is 0 the processing proceeds to step S709.

In step S707, the system controller 205 determines whether it has received a response command from the video camera 100. The system controller 205 advances processing to step S708 if a response command has been received, and if that is not the case returns to step S703 and repeats processing. In this way, even if focus guide information is received, if an MF action in response to an MF operation performed in accordance with the smart phone 200 has not yet been executed by the video camera 100 (in other words if the during MF flag=1), the display of the focus guide does not update. By this, mistakenly returning a display of a provisional focus guide updated in step S712 which is described later to its original state based on information for before an MF action based on an MF operation is prevented. In step S708, the system controller 205 sets the during MF flag to 0.

In step S709, the system controller 205, based on the latest focus guide information received in step S705, updates the display of the focus guide that is displayed on the display 107 of the smart phone 200 (newly displayed in a case of not yet being displayed).

In step S710, the system controller 205 determines whether an MF operation at the smart phone 200 has been performed. Specifically, whether any of the MF buttons 414-419 have been touched is determined. If any of the MF buttons 414-419 have been touched. (an. MF operation has been performed) the processing proceeds to step S711, and if none have been touched the processing proceeds to step S714.

In step S711, the system controller 205 transmits to the video camera 100 an MF command indicating a direction defined by the touched MF button (near side or telephoto side) and a defocus amount (an operation amount).

In step S712, the system controller 205 updates the display of the focus guide displayed on the display 107, based on the direction defined by the touched MF button (near side or telephoto side) and the defocus amount (an operation amount). More specifically, for each MF button is defined an MF driving amount in accordance with a defocus amount, so as to transmit a fraction of the depth of focus.

Therefore, based on information of the depth of focus of a lens included in the camera-side information obtained in step S701, the system controller 205 calculates a defocus amount (a change amount for the defocus amount) that changes in accordance with each. MF button. By adding it to the current defocus amount, a prediction value indicating what a defocus amount becomes as a result of operation of each MF button is calculated. Note that because the defocus amount changes due to factors such as the distance between the subject and the camera and not just the driving amount for a lens, the prediction value for the defocus amount calculated here is not necessarily correct. Based on a prediction value for the defocus amount that is calculated in this way, provisional focus guide information (focus level information and information of which state of in-focus/front-focused/rear-focused it is) is calculated, and the display of the focus guide is updated based on the generated focus guide information. The provisional focus guide information may be in a form of angles of wedge types, and a position in the live view image and a size of the frame. In this way, instead of receiving a defocus amount from the video camera 100 after an MF action is actually performed in accordance with an MF command, updating is performed by generating a display of a provisional focus guide by the smart phone 200 in accordance with an operation direction and operation amount of an MF operation. By performing in this way, because display of the focus guide is updated with good responsiveness to a user operation, it is possible to prevent operating error such as an MF operation by a user going too far, and it is possible to realize an MF operation with good operability. In step S713, the system controller 205 sets the during MF flag to 1, and the processing advances to step S703 and repeats.

In step S714, the system controller 205 determines whether there is a change operation for the focus guide position at the smart phone 200. For example, by touching any position on the displayed LV image 413, a user can designate a desired focus guide position. If the system controller 205 determines that a user made an operation with respect to the touch panel 201 for changing the focus guide position, the processing proceeds to step S715, and otherwise the processing proceeds to step S716. In step S715, the system controller 205 transmits coordinates of the touched position (position designated) along with a change command for the focus guide position to the video camera 100. Thereafter processing returns to step S703 and repeats.

In step S716, the system controller 205 determines whether there is a REC instruction. The system controller 205 determines the existence or absence of a REC instruction in. Accordances with whether the REC button 412 has been touched for example, and if the REC button 412 has been touched, the processing advances to step S717, and a REC command is transmitted to the video camera 100. Meanwhile, a REC button. 412 has not been touched, the processing proceeds to step S718.

In step S718, the system controller 205 determines whether there is another operation. If there is another operation the processing proceeds to step S719, otherwise the processing proceeds to step S720. In step S719, the system controller 205 performs processing in accordance with the other operation. As the other operation, a touch operation to the zoom key 421 or the zoom key 420 for example is included. If either of the zoom key 420 and the zoom key 421 are touched, the system controller 205 transmits a zoom command in accordance with the touched key to the video camera 100. In addition, as the other operation for example a still image capturing operation command is included. If a still image capturing operation in accordance with a touch operation to a still image capturing button. (not shown) is performed, the system controller 205 transmits a still image capturing command to the video camera 100. In addition, as the other operation, an ON/OFF switching operation for the focus guide display is included for example. If there is an ON/OFF operation of the focus guide display, the system controller 205 transmits a command to the video camera 100 with the gist of turning off in the case of on and turning on in the case of off. Furthermore, in the case of becoming off, the focus guide displayed in the display 204 set to non-display.

In step S720, the system controller 205 determines whether there is a termination event. A termination event includes, for example, cutting of communication with the video camera 100, turning a power supply off at the smart phone 200, switching an operation mode to an operation mode (for example a playback mode) other than an image capturing mode, termination of application software for remote capturing, or the like. If there is no termination event, the processing returns to step S703 and processing repeats, and if there is a termination event the series of operations of this processing according to FIG. 7B end.

Note that, order for the processing of step S712 and step S711 previously described may be reversed. In addition, if the order is reversed (if the processing of step S711 is performed after step S712), configuration may be taken such that the system controller 205 does not transmit an MF command in step S711, in accordance with a result of generation of the provisional focus guide information described in step S712. That is, configuration may also be taken to not transmit an MF command if exceeding in-focus is calculated. For example, when successive MF operations are performed by a user, if, in accordance with calculation of the previously described provisional focus guide information, it is determined that focus has been reached and furthermore that the focus is to be exceeded, and as long as the during MF flag is 1, an MF command, in accordance with an MF operation in a direction for exceeding the focus is not transmitted. If the during MF flag becomes 0 (in other words, MF in accordance with a transmitted MF command has been executed and that this has been reflected in the focus guide of the smart phone 200 is confirmed) and there is an MF operation in the direction of exceeding the focus again, an MF command corresponding to the operation is transmitted. With such a configuration, if there are successive MF operations, it is possible to stop MF driving temporarily at a position for focus, and provide an opportunity for confirming an accurate focus guide display (that is not the provisional display in step S712 but the true display in step S709) at an in-focus state to a user. Therefore, it is possible to more reliably prevent, an MF operation from going too far, and a user can more easily achieve an in-focus state in accordance with an MF operation. In addition, because the focus guide display of step S712 is something provisional that is displayed by the smart phone 200, and is not something based on phase difference information actually obtained from the image sensor 102, additionally a display form may be changed so that it can be differentiated from the true display of step S709. For example, configuration make be taken so as to display the focus guide displayed in step S712 by a color different to the focus guide displayed by the processing of step S709, display by blinking, or the like.

Furthermore, in step S712, although explanation was given of an example in which the system controller 205 calculated focus guide information based on lens information and an MF button that was operated, configuration may also be taken such that the display of the focus guide is updated without being based on lens information. With such a configuration, although there is a possibility that accuracy will be inferior to when using lens information, there is the merit of being able to make the program of the smart phone 200 be something simpler. In addition, there is the merit of also being able to support a case in which it is not possible to obtain lens information. (a case in which a lens attached to the video camera 100 is an unknown lens, for example).

(Variation)

Furthermore, in step S712 described previously, although explanation was given of an example in which the system controller 205 calculated focus guide information based on lens information and an MF button that was operated, configuration may also be taken to not calculate focus guide information in the smart phone 200 as follows.

The video camera 100 obtains the MF driving amount defined for each MF button based on the remote-controller-side information received in step S601. Specifically, information indicating the MF driving amount of each the MF button is transmitted from the smart phone 200 and the video camera 100 receives this to thereby obtain it. Alternatively, configuration may be taken such that it is read from a correspondence table stored in the ROM 111*a* of the video camera 100 in advance, based on information of the application program of the smart phone 200 that is transmitted from the smart phone 200 (a program name and version information). The system controller 111, each time focus guide information is generated at that point in time in step S607, calculates a defocus amount for a case of performing driving of a MF driving amount defined for each MF button (the MF buttons 414-419) from a defocus amount of that point in time, and in conjunction with this also generates focus guide information for cases in which each MF button is pressed. In other words, a total of seven pieces of focus guide information are generated: the focus guide information of the current focus position (something based on the phase difference information output from the image sensor 102), and six pieces of focus guide information (estimate information) for the cases in which the MF buttons 414-419 are touched. In step S608 the seven pieces of focus guide information are transmitted to the smart phone 200. For the form of the focus guide information to transmit, instead of focus level information and information on which state out of in-focus/front-focused/rear-focused, a form that indicates the size of the frame, the position in the live view image, and the angle of the wedge shape is advantageous.

In addition, each time the focus guide information is received in step S705, the smart phone 200 performs the processing of step S706-step S709 based on the focus guide information of the present focus position, and also stores in the volatile memory 209 six pieces of focus guide information (estimate information) for cases when the MF buttons 414-419 are touched. In step S712, focus guide information corresponding to an operated MF button is read from the volatile memory 209, and based on this an update of the provisional focus guide information is performed. In this way a necessity to generate the focus guide information in the smart phone 200 ceases, and it is possible to further simplify the application program of the smart phone 200, and realize a display with faster processing and better responsiveness.

Note that control of the system controller 111 or the system controller 205 may be performed by one piece of hardware, or, by a plurality of pieces of hardware distributing processing, control of an apparatus overall may be performed. In the description given above, description was given regarding an example in which the video camera 100 and the smart phone 200 establish a communication link by a wireless connection, but it goes without saying that the connection between the devices may be a wired connection, and anything may be used in relation to a communication specification or protocol.

In addition, although the present invention was explained in detail based on suitable embodiments, the present invention is not limited to these specific embodiments, and various forms of a scope that does not deviate from the gist of this invention are included in the invention. Furthermore, each of the above described embodiments of the present invention merely indicate one embodiment and it is possible to combine embodiments as appropriate.

In addition, in the embodiments described above, although explanation was given of an example of a case of applying the present invention to a smart phone, there is no limitation to this example, and the present invention can be applied in the case of an electronic device that can perform a remote operation of an image capturing apparatus provided with a communication unit. In other words, the present invention can be applied to a personal computer, a mobile telephone terminal, a tablet terminal (including a PDA), a genie device, an watch-type or glasses-type information terminal, a monitoring system, a medical device, a portable image viewer, a digital photo frame, or the like.

Other Embodiments

Embodiment(s) of the present invention can also be realized by a computer of a system or apparatus that reads out and executes computer executable instructions (e.g., one or more programs) recorded on a storage medium (which may also be ref erred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit ((MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical dish (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application to 2016-001292, filed Jan. 6, 2016 which is hereby incorporated by reference herein in its entirety.

What is claimed is:

1. An electronic device, comprising:
a receiving unit configured to receive a focus adjustment operation for remotely operating an image capturing apparatus;
an obtainment unit configured to transmit to the image capturing apparatus a focus adjustment command in accordance with having received the focus adjustment operation by the receiving unit, and to obtain from the image capturing apparatus information used for a guide display indicating a focus level of a particular region of a captured image that is information based on a result of performing a focus adjustment based on the transmitted focus adjustment command; and
a display control unit configured to display the guide display based on the information obtained from the image capturing apparatus by the obtainment unit,
wherein the display control unit, in a case when the receiving unit receives the focus adjustment operation, displays the guide display based on the focus adjustment operation before obtaining by the obtainment unit the information based on the result of performing the focus adjustment based on the focus adjustment command.

2. The device according to claim 1, wherein the information is information based on a defocus amount detected in the image capturing apparatus.

3. The device according to claim 2, wherein the defocus amount is information based on a phase difference obtained by an image sensor provided in the image capturing apparatus.

4. The device according to claim 1, wherein the information includes information indicating one of an in-focus state is which an in-focus position is at as imaging plane of the image sensor, a state in which the in-focus position is forward of the imaging plane, or a state in which the in-focus position is rearward of the imaging plane, and information indicating a focus level in the state.

5. The device according to claim 1, wherein the guide display is a display for expressing information indicating one of an in-focus state in which an in-focus position is at an imaging plane of the image sensor, a state in which the in-focus position is forward of the imaging plane, and a state in which the in-focus position is rearward of the imaging plane, and a focus level in the state.

6. The device according to claim 1, wherein the guide display is displayed, in a live view for consecutively display images from the image capturing apparatus, at a position corresponding to the particular region of an image.

7. The device according to claim 1, wherein the guide display can be displayed either during a recording standby or during recording of a video by the image capturing apparatus.

8. The device according to claim. 1, wherein the receiving unit further receives an operation for designating the particular region, and
the display control unit displays the guide display for a position in accordance with the operation for designating the particular region.

9. The device according to claim 1, wherein the display control unit, after transmitting the focus adjustment command to the image capturing apparatus, does not display the guide display based on the information obtained by the obtainment unit until a response command corresponding to the focus adjustment command is obtained from the image capturing apparatus.

10. The device according to claim 1, wherein the display control unit causes the guide display, displayed based on the focus adjustment operation before the information based on a result of performing the focus adjustment based on the transmitted focus adjustment command is obtained from the image capturing apparatus, to differ from a display form of the guide display displayed based on the information based on a result of performing the focus adjustment based on the transmitted focus adjustment command.

11. The device according to claim 1, wherein the display control unit predicts a result of a focus adjustment based on the focus adjustment operation, and displays the guide display based on the prediction.

12. The device according to claim. 11, wherein the display control unit predicts a defocus amount for when a focus adjustment is performed based on the focus adjustment operation, and displays the guide display based on the predicted defocus amount.

13. The device according to claim 11, wherein the control unit, if an in-focus position based on the prediction exceeds an imaging plane, does not transmit the focus adjustment command after having transmitted the focus adjustment command to cause the in-focus position to change to the imaging plane.

14. The device according to claim 1, wherein the obtainment unit further obtains information indicating a current focus level from the image capturing apparatus, and obtains from the present focus level a plurality of pieces of estimate information respectively indicating focus levels to be predicted if a plurality of focus adjustment operations are performed, and
the display control unit, upon receiving the focus adjustment operation, displays the guide display based on estimate information corresponding to the focus adjustment operation out of the plurality of pieces of estimate information.

15. A control method of an electronic device having:
receiving a focus adjustment operation for remotely operating an image capturing apparatus;
transmitting to the image capturing apparatus a focus adjustment command in accordance with having received the focus adjustment operation, and obtaining from the image capturing apparatus information used for a guide display indicating a focus level of a particular region of a captured image that is information based on a result o, performing a focus adjustment based on the transmitted focus adjustment command; and
controlling to display the guide display based on the information obtained from the image capturing apparatus,
wherein the controlling to display, in a case of receiving the focus adjustment operation, displays the guide display based on the focus adjustment operation before obtaining the information based on the result of performing the focus adjustment based on the focus adjustment command.

16. A non-transitory computer-readable storage medium storing a program for causing a computer to execute a control method of an electronic device having:
receiving a focus adjustment operation for remotely operating an image capturing apparatus;
transmitting to the image capturing apparatus a focus adjustment command in accordance with having received the focus adjustment operation, and obtaining from the image capturing apparatus information used for a guide display indicating a focus level of a particular region of a captured image that is information based on a result of performing a focus adjustment based on the transmitted focus adjustment command; and
controlling to display the guide display based on the information obtained from the image capturing apparatus,
wherein the controlling to display, in a case of receiving the focus adjustment operation, displays the guide display based on the focus adjustment operation before obtaining the information based on the result of performing the focus adjustment based on the focus adjustment command.

* * * * *